(12) United States Patent
Stone

(10) Patent No.: US 7,660,502 B1
(45) Date of Patent: Feb. 9, 2010

(54) OPTICAL INTERCONNECT AND CONNECTOR DEVICES

(75) Inventor: Thomas W. Stone, Hellertown, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 0 days.

(21) Appl. No.: 11/777,170

(22) Filed: Jul. 12, 2007

Related U.S. Application Data

(60) Provisional application No. 60/830,294, filed on Jul. 12, 2006.

(51) Int. Cl.
*G02B 6/04* (2006.01)
*G02B 6/255* (2006.01)

(52) U.S. Cl. ............... 385/115; 385/95; 385/99
(58) Field of Classification Search ............. 385/95, 385/97, 99, 115
See application file for complete search history.

(56) References Cited

U.S. PATENT DOCUMENTS

| | | | |
|---|---|---|---|
| 4,148,550 A | 4/1979 | MacAnally | 350/54 |
| 4,168,882 A | 9/1979 | Hopkins | 350/54 |
| 4,612,670 A | 9/1986 | Henderson | 455/607 |
| 5,050,954 A | 9/1991 | Gardner et al. | 386/16 |
| 5,071,216 A | 12/1991 | Sullivan | 385/34 |
| 5,093,879 A | 3/1992 | Bregman et al. | 385/93 |
| 5,245,680 A | 9/1993 | Sauter | 385/24 |
| 5,266,794 A | 11/1993 | Olbright et al. | 250/214 LS |
| 5,291,324 A | 3/1994 | Hinterlong | 359/135 |
| 5,384,874 A | 1/1995 | Hirai et al. | 385/34 |
| 6,122,042 A | 9/2000 | Wunderman et al. | 356/73 |
| 6,222,970 B1 * | 4/2001 | Wach et al. | 385/115 |
| 6,253,004 B1 | 6/2001 | Lee et al. | 385/31 |

OTHER PUBLICATIONS

Kenjiro Hamanaka "Optical Bus Interconnection System Using Selfoc Lenses", *Optics Letters* vol. 16, No. 16; 1222-1224, Aug. 15, 1991.

Hugo Thienpont, et al. "Free Space Optical Interconnect and Processing Demonstrators With Arrays of Light-Emitting Thyristors", *Proceedings of the SPIE*, vol. 3002, 156-167, Conference date Feb. 13-14, 1997 [probably published several months later].

Andrew Kirk, et al. "Compact Optical Imaging System for Arrays of Optical Thyristors", *Applied Optics 36*, No. 14, 3070-3078, May 10, 1997.

V. Baukens, et al. "An Optical Interconnection System for Arrays of MicroEmitters and Detectors: Combining Printed Microlenses and Large Diameter GRINs", *Proceedings of the SPIE*, vol. 3490, 155-158, Conference date (Belgium) Jun. 17-20, 1998 [probably published several months later].

Tomasz Maj, et al. "Interconnection of a Two-Dimensional Array of Vertical-Cavity Surface-Emitting Lasers to a Receiver Array by Means of a Fiber Image Guide", *Applied Optics* vol. 39, No. 5, 683-689, Feb. 10, 2000.

Donald M. Chiarulli, et al. "Demonstration of a Multichannel Optical Interconnection by Use of Imaging Fiber Bundles Butt Coupled to Optoelectronic Circuits", *Applied Optics* vol. 39, No. 5, 698-703, Feb. 10, 2000.

(Continued)

*Primary Examiner*—Kevin S Wood
(74) *Attorney, Agent, or Firm*—Burns & Levinson LLP; Jacob N. Erlich; Orlando Lopez

(57) ABSTRACT

Methods and systems for optical interconnection.

8 Claims, 24 Drawing Sheets

OTHER PUBLICATIONS

Donald M. Chiarulli, et al. "Optoelectronic Multi-Chip Modules Based on Imaging Fiber Bundle Structures", *Proceedings of the SPIE*, vol. 4089, 80-85, Conference date Jun. 18-23, 2000 [probably published several months later].

Valerie Baukens, et al. "Free Space Optical Interconnection Modules for 2-D Photonic-VLSI Circuitry Based on Microlenses and GRINs", *Proceedings of the SPIE*, vol. 4114, 169-181, Conference date Aug. 2-3, 2000 [probably published several months later].

Mohammad R. Taghizadeh, et al. "Microoptical Elements and Optoelectronic Devices for Optical Interconnect Applications", *Proceedings of the SPIE*, vol. 4455, 119-130, Conference date Jul. 29-31, 2001 [probably published several months later].

* cited by examiner expected 19-fiber
alignment pattern

Experimentally observed
19-fiber
alignment

Pattern for experimentally
observed 19-fiber
alignment regular hexagonal
packing
(predicted)

hybrid hexagonal
packing
(observed)

Sensor Family

Specifications Multimode

| Model | Operating Wavelength (nm) | Index Profile | NA | Core Diameter (μm) | Cladding Diameter (μm) | Coating Diameter (μm) | Bent Radius, Minimum 60 min./20 yrs. (mm) | Bandwidth (MHz/km) |
|---|---|---|---|---|---|---|---|---|
| F-MBB | 500-1100 | Step | 0.37 | 200 ±4 | 230 +0/-10 | 500 ±30 | 10/16 | 20 |
| F-MBB-C* | 500-1100 | Step | 0.37 | 200 ±4 | 230 +0/-10 | 500 ±30 | | 20 |
| F-MBC | 500-1100 | Step | 0.37 | 400 ±8 | 430 +5/-10 | 730 ±30 | 29/47 | 13 |
| F-MBD | 500-1100 | Step | 0.37 | 600 ±10 | 630 ±10 | 1040 ±30 | 58/94 | 9 |
| F-MBE | 500-1100 | Step | 0.37 | 1000 ±15 | 1035 ±15 | 1400 ±50 | 73/118 | |
| F-MCB-T | 250-1100 | Step | 0.22 | 100 ±3 | 110 ±3 | 140 ±5 | 9/14 | 25 |
| F-MCC-T | 250-1100 | Step | 0.22 | 200 ±5 | 220 ±5 | 250 ±5 | 17/28 | 25 |

OPTICAL INTERCONNECT AND CONNECTOR DEVICES

CROSS REFERENCE TO RELATED APPLICATIONS

This application claims priority of U.S. provisional application Ser. No. 60/830,294 entitled OPTICAL INTERCONNECT AND CONNECTOR DEVICES filed Jul. 12, 2006, which is incorporated by reference herein in its entirety.

STATEMENT OF FEDERALLY SPONSORED RESEARCH OR DEVELOPMENT

This invention was made with U.S. Government support from the United States Air force under Contract FA8650-04-C-3414. The U.S. Government has certain rights in the invention.

BACKGROUND

This invention relates generally to optical interconnects.

Current optical fiber connector and breakout/fanout technologies limit applications because the connectors are heavy, large, and costly. Some of these conventional optical interconnects systems are too susceptible to contamination, as from dirt, dust, and cooling fluids. Still other connector devices are too sensitive to small misalignments or temperature fluctuations.

There is a need for optical connectors that are small and potentially inexpensive. There is also a need for optical connectors that are less susceptible to contamination and for optical connectors that are less sensitive to small misalignments or temperature fluctuations.

SUMMARY

In one embodiment, the system of these teachings includes an array of optical fibers, an end portion of the array being arranged such that each optical fiber from the array substantially contacts at least two other optical fibers from the array and an optical subsystem having a first end and a second end, the end portion of the array being operatively connected to the first end of the optical subsystem. Each optical fiber in the end section is capable of emitting electromagnetic radiation and the optical subsystem is capable of receiving the electromagnetic radiation emitted by each fiber and forming an image substantially at infinity (the optical subsystem being hereinafter referred to as an infinite conjugate optical subsystem or as substantially collimating the electromagnetic radiation emission from each optical fiber).

In another embodiment of the system of these teachings, the embodiment includes another (a second) optical subsystem having a first end and a second end, a first end of the second optical subsystem being optically positioned to receive electromagnetic radiation from the second end of the first optical subsystem, and also includes another array of optical fibers, an end portion of the other array being arranged such that each optical fiber from the other array substantially contacts at least two other optical fibers from the other array, the end portion of the other array being operatively connected to the second end of the second optical subsystem. Each optical fiber in the second array of optical fibers is optically disposed such that each optical fiber from the second array of optical fibers is capable of receiving electromagnetic radiation from the second end of the second optical subsystem. The end portion of the first array of optical fibers, the first optical subsystem, the second optical subsystem, and the end portion of the second array of optical fibers are optically disposed such that electromagnetic radiation emanating from one optical fiber from the end portion of the first array is imaged onto another optical fiber from the end portion of the second array.

Other embodiments of the system of these teachings are also disclosed as well as methods for manufacturing the system of these teachings.

For a better understanding of the present teachings, together with other and further objects thereof, reference is made to the accompanying drawings and detailed description and its scope will be pointed out in the appended claims.

DETAILED DESCRIPTION

Some embodiments of the present teachings are described in FIGS. 1-8. One embodiment of the system of these teachings (this embodiment also referred to as Ultra-Dense Alignment Tolerant (UDAT) optical fiber connector system) utilizes a pair of infinite conjugate imaging systems with pre-aligned and rigidly fixed hexagonally packed fiber bundles.

Figure 1:
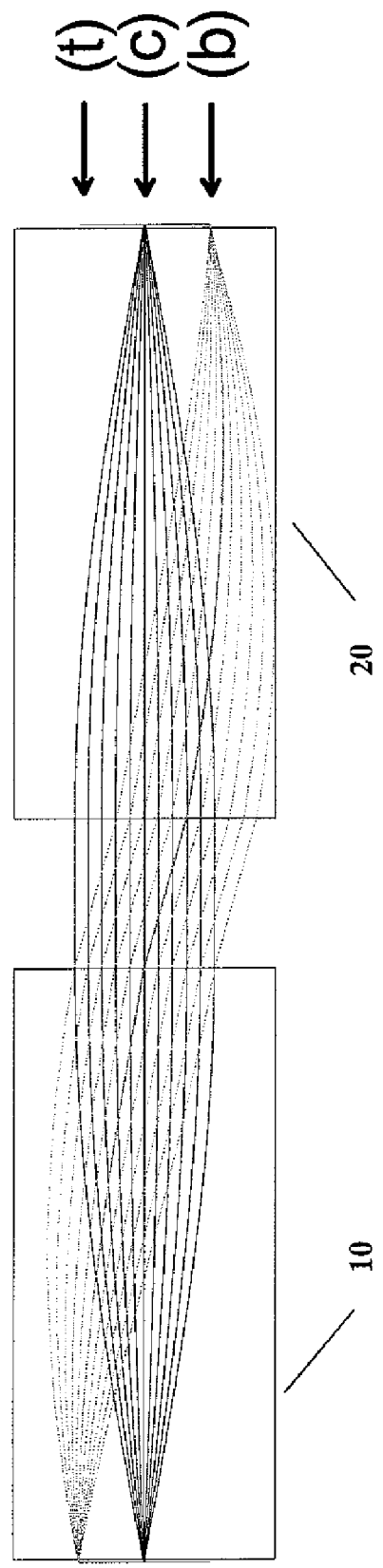
FIG. 1 is a schematic representation of an embodiment of an infinite conjugate imaging system as used in these teachings.

The Ultra-Dense Alignment Tolerant (UDAT) fiber optic connector embodiment is illustrated in FIG. 1. In the UDAT connector/optical fibers are arranged in a tightly packed array, which is aligned and affixed onto an infinite conjugate rod lens. (It should be noted that other infinite conjugate lenses are within the scope of these teachings.) As discussed herein below, pairs of these lenses may then be used to form substantially telecentric and alignment tolerant interconnection.

Some of the embodiments of the system of these teachings that are shown herein below are related to the alignment tolerant infinite conjugate imaging system disclosed in U.S. patent application Ser. Nos. 11/385,449, 10/675,873, and 09/425,551 Embodiments are described in FIGS. 1 and 2.

Referring to FIG. 1, the imaging system shown therein includes matched pairs of infinite conjugate rod lens imagers. An optical fiber placed on-axis at the first rod lens 10 (left) is imaged onto the fiber at the center position (c) on the second rod lens 20 (right). Many fibers can be simultaneously imaged between other points such as those labeled (t) and (b) (See FIG. 2). This imaging can be telecentric, giving rise to efficient fiber coupling for fibers distributed across the face.

In many configurations this imaging is effectively telecentric, which gives rise to very efficient fiber coupling for fibers distributed across the face.

Figure 2:
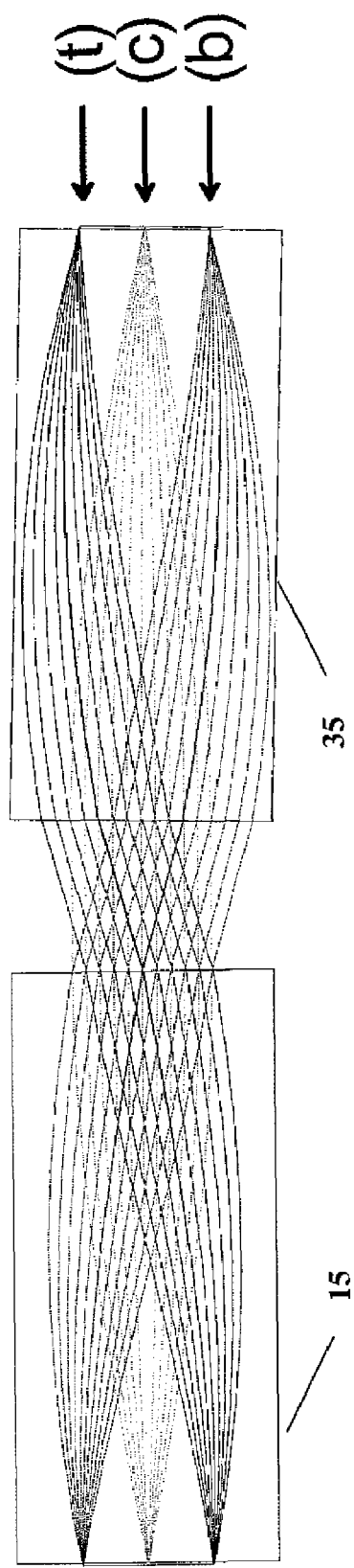
FIG. 2 is a schematic representation of another embodiment of an infinite conjugate imaging system as used in these teachings.

FIG. 2 depicts the imaging system disclosed in U.S. patent application Ser. Nos. 11/385,449, 10/675,873, and 09/425,551. The imaging system shown in FIG. 2 is tolerant of misalignments in gap (separation between the lenses), lateral translations, and angular misalignments (shown). Good quality imaging can be obtained from top (t) to bottom (B) field points, allowing many optical fibers to be densely interconnected (see FIG. 3).

Figure 3:
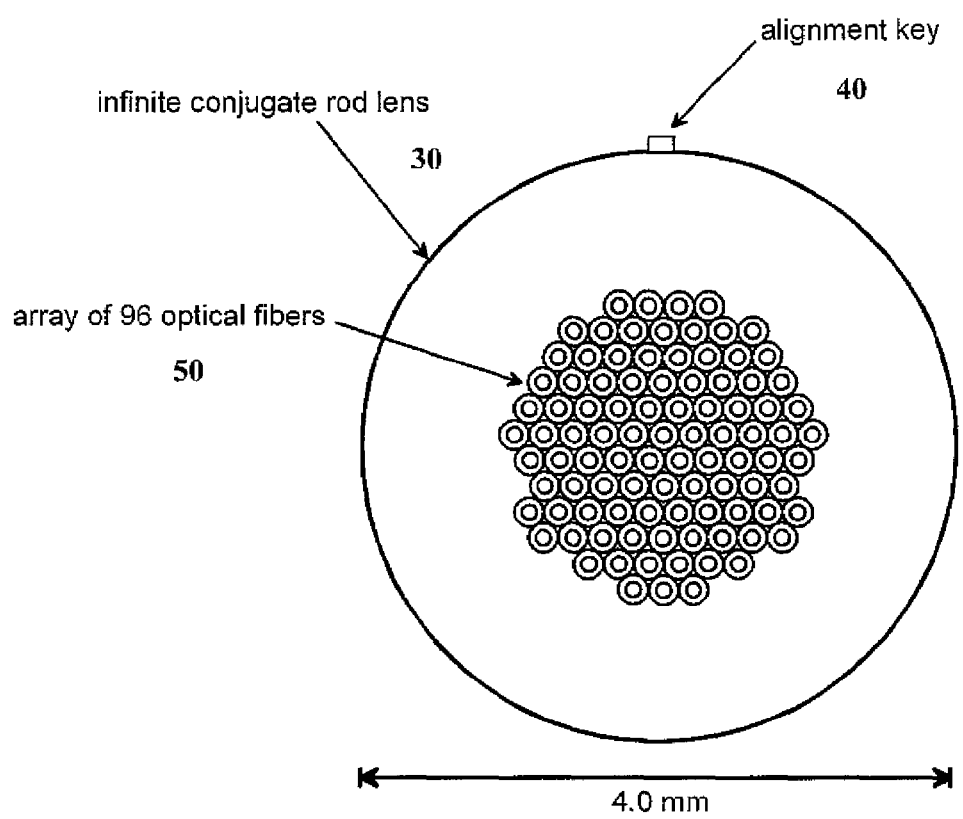
FIG. 3 is a schematic representation of an embodiment of the system of these teachings.

In FIG. 2, real rays are shown for the case of a 4 mm diameter rod lens pair separated by a 2.6 mm air gap. This infinite conjugate rod lens imaging system, disclosed in U.S. patent application Ser. Nos. 11/385,449, 10/675,873, and 09/425,551, exhibits tolerance to changes in the air gap length and angular misalignments. In the system shown in FIG. 2, each fiber output is transformed into a broad plane wave in the air gap region, each at a different angle. Because the output from each fiber is a wide collimated beam in this region, there is this is insensitivity to lateral translations when compared to other imaging interconnects. Further, contamination, dirt, and oil films in this region only result in slow graceful degradation of the coupled signals. In embodiments of the system of these teachings (UDAT-ultra dense connector technology), an array of optical fibers is substantially rigidly fixed to each of the rod lens imagers 15, 35 as shown in FIG. 3 for an array of 96 optical fibers. In one embodiment, an alignment key is used to orient the rod lens pairs relative to each other in the UDAT connector.

Figure 7:
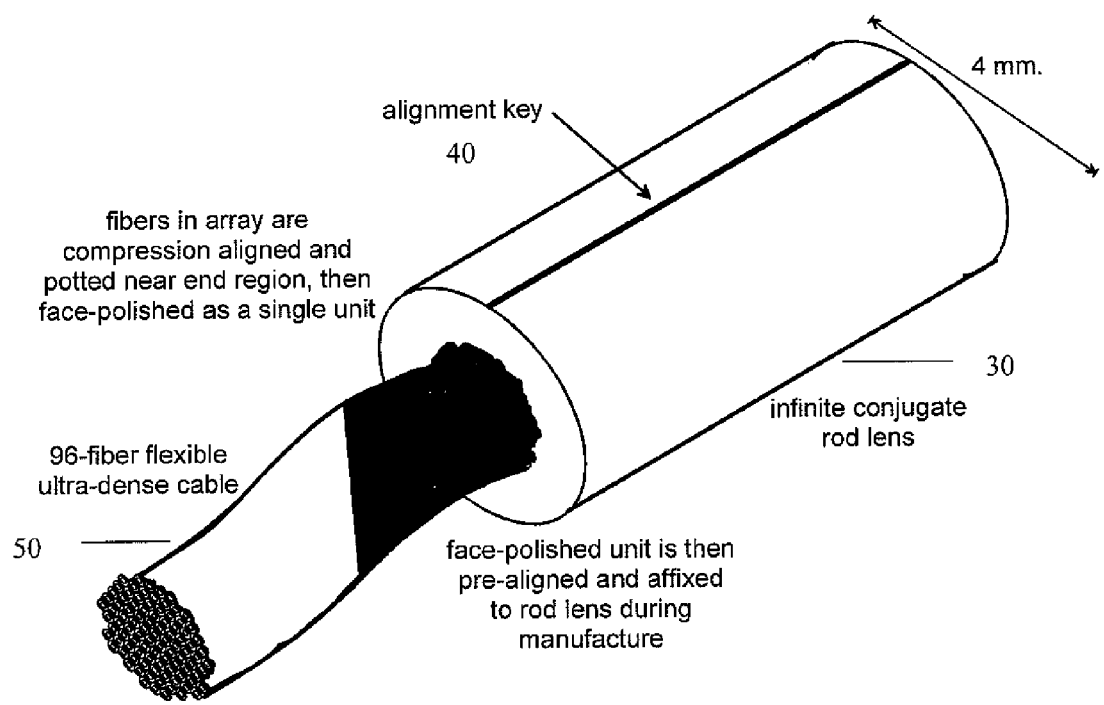
FIG. 7 is another schematic representation of an embodiment of the system of these teachings.

Referring to FIG. 3, in the embodiment shown there in an array of 96 optical fibers 50 (it should be noted that these teachings are not limited to a given number of optical fibers) is aligned on the face of a rod lens. In other embodiments, many optical fibers are packed in a dense array, which is aligned and affixed to the back of an infinite conjugate gradient index rod lens 30 (it should be noted that other infinite conjugate optical subsystems are also within the scope of this teachings) which is used In an essentially telecentric alignment tolerant imaging configuration. In one instance, these teachings not been limited to only that instance, the core of each of these fibers is 100 μm in diameter. An alignment key 40 is used to orient the rod lens pairs relative to each other in the UDAT connector. An oblique view of the UDAT Connector embodiment is shown in FIG. 7.

Figure 4:
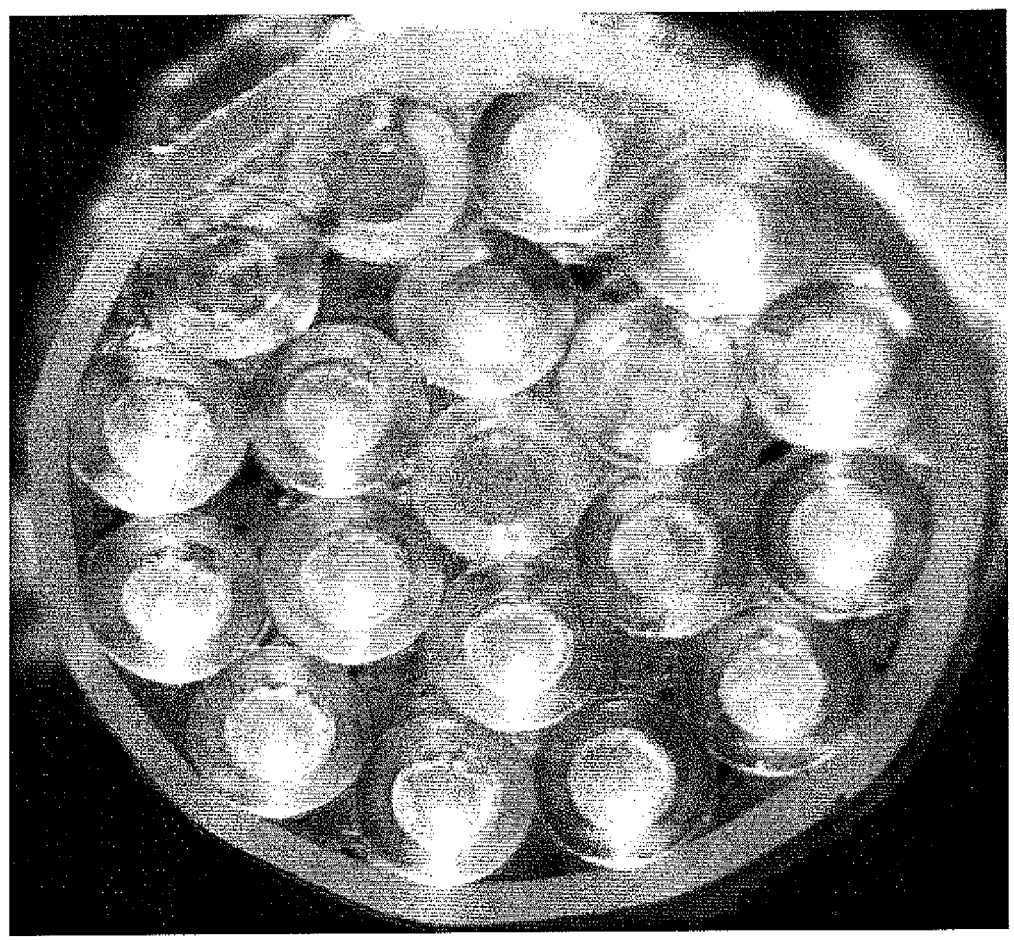
FIG. 4 is a graphical schematic representation of a component of an embodiment of the system of these teachings.

FIG. 4 shows an embodiment (UDAT fiber array) including 19 fibers and compressed by a Teflon tube.

Figure 5:
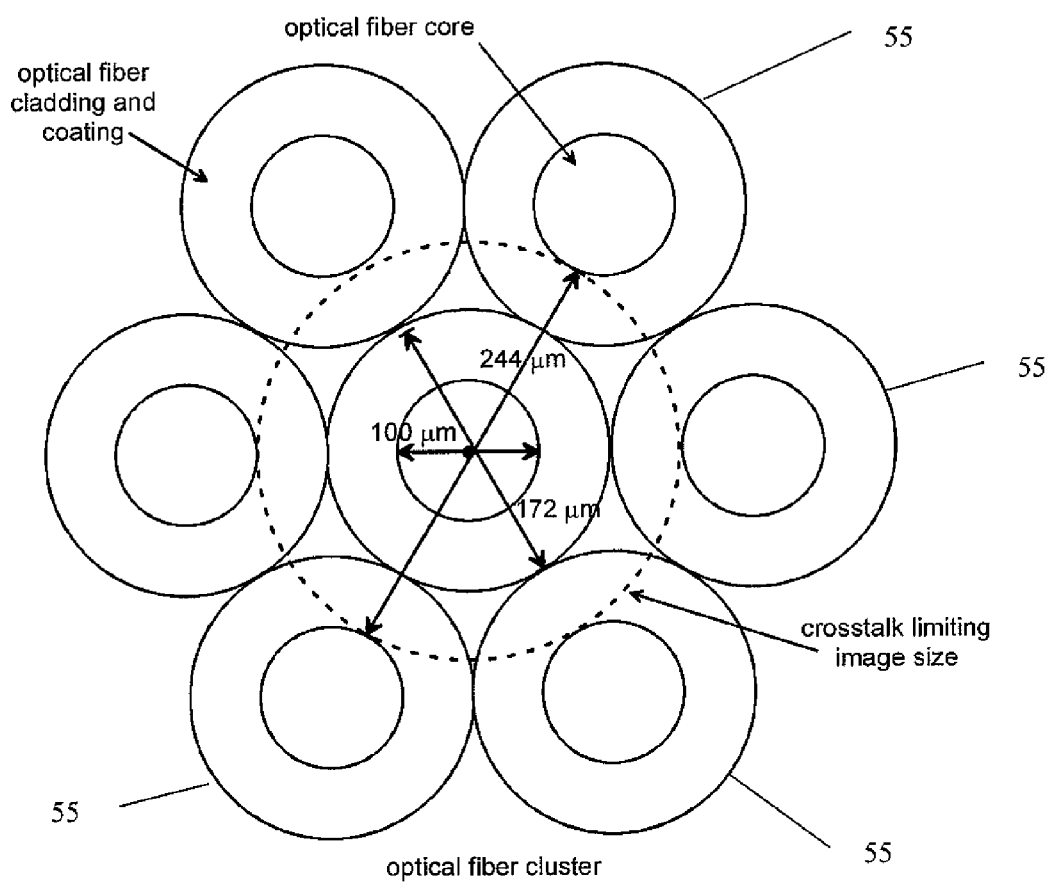
FIG. 5 is another graphical schematic representation of a component of an embodiment of the system of these teachings.

FIG. 5 shows fibers in an embodiment of the UDAT Connector of these teachings.

Each fiber 55 has a core diameter of 100 μm, and an outside cladding/coating diameter of 172 μm. The tolerance of the outside diameter is 2 μm for unsorted fiber, opening the possibility of simple compression alignment of the bundle. An imaged spot can be blurred to a diameter of 244 microns before crosstalk is an issue.

An illustrative embodiment including a hexagonal packing configuration for the fiber array on the face of the rod lens is shown in FIG. 5. In the illustrative embodiment shown there in, each fiber has a core diameter of 100 μm, and an outside cladding/coating diameter of 172 μm. The tolerance of the outside diameter is 2 μm for unsorted fiber, allowing for simple compression alignment of the bundle. An imaged spot can be blurred to a diameter of 244 microns before crosstalk is an issue. Detailed modeling of the imaging quality for this configuration is described herein below.

Figure 6:
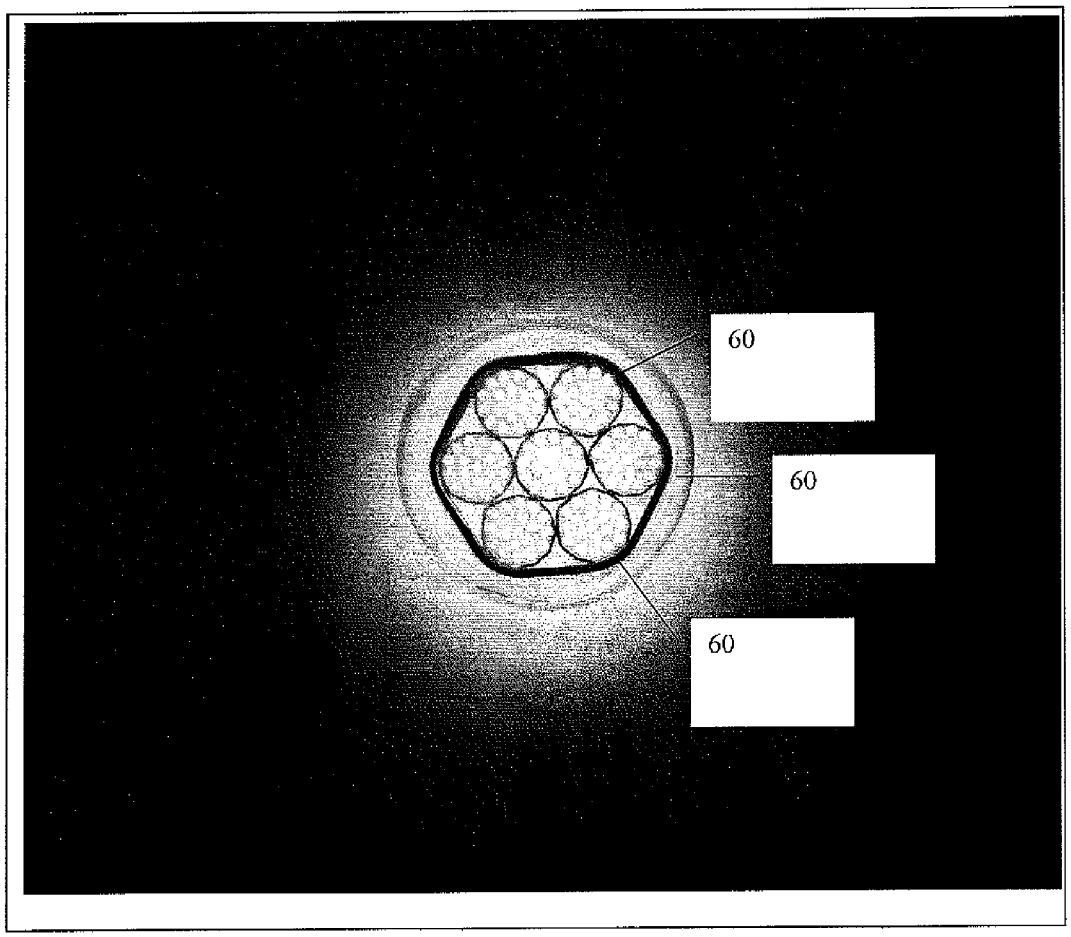
FIG. 6 is a graphical schematic representation of another component of an embodiment of the system of these teachings.

FIG. 6 shows an embodiment including a 133-Fiber Hybrid Superarray Geometry UDAT Array fabricated from 7 subarrays 60, each containing 19 optical fibers (it should be noted that these teachings are not limited to only this embodiment). Similar embodiments may lead to very inexpensive, high performance UDAT arrays containing 49, 133, or 361 optical fibers.

The UDAT connector embodiment is further illustrated in FIG. 7.

Referring to FIG. 7, in an oblique view of an exemplary embodiment, the dense array of 96 fibers 50 is prealigned to the infinite conjugate rod lens imager 30 during manufacture. Pre-alignment can be facilitated by compression aligning and potting the fibers near the end, and subsequently polishing and aligning the array as a unit. The unit is then aligned and cemented to the rod lens (it should be noted that other means of affixing or securing the fiber array to the infinite conjugate lens are also within the scope of these teachings.). An alignment key 40 is used to orient the array in the connector system.

Figure 8:
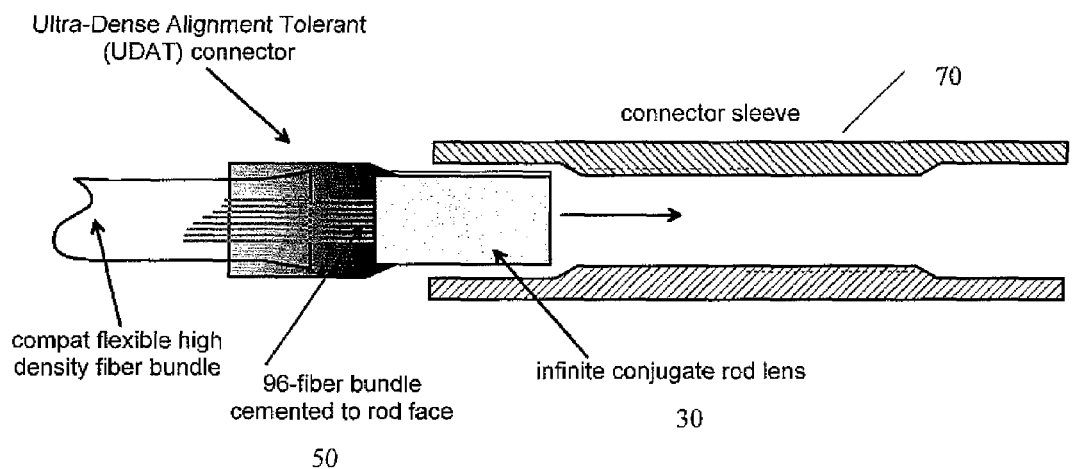
FIG. 8 is a schematic representation of another embodiment of the system of these teachings.

The embodiment shown in FIG. 7 mates with other connectors using a simple connector sleeve, as shown in FIG. 8.

Referring to FIG. 8, an embodiment of the system of these teachings (UDAT connector) is inserted in a connector sleeve 70 providing the required alignment. In one instance, the alignment key mates to a slot in the sleeve (dotted line). (It should be noted that the alignment key/mating slot combination is only one embodiment of the two corresponding alignment features of these teachings.) This connector system is dense and insensitive to many field-misalignments. Further, since each fiber output is a wide plane wave in the gap region between connectors, this embodiment is insensitive to contamination in the connector sleeve. In one instance, the UDAT connector has a grip for insertion, and the dense 96 fiber bundle can be wrapped in a jacket with an overall diameter of less than 4 mm.

Figure 9:
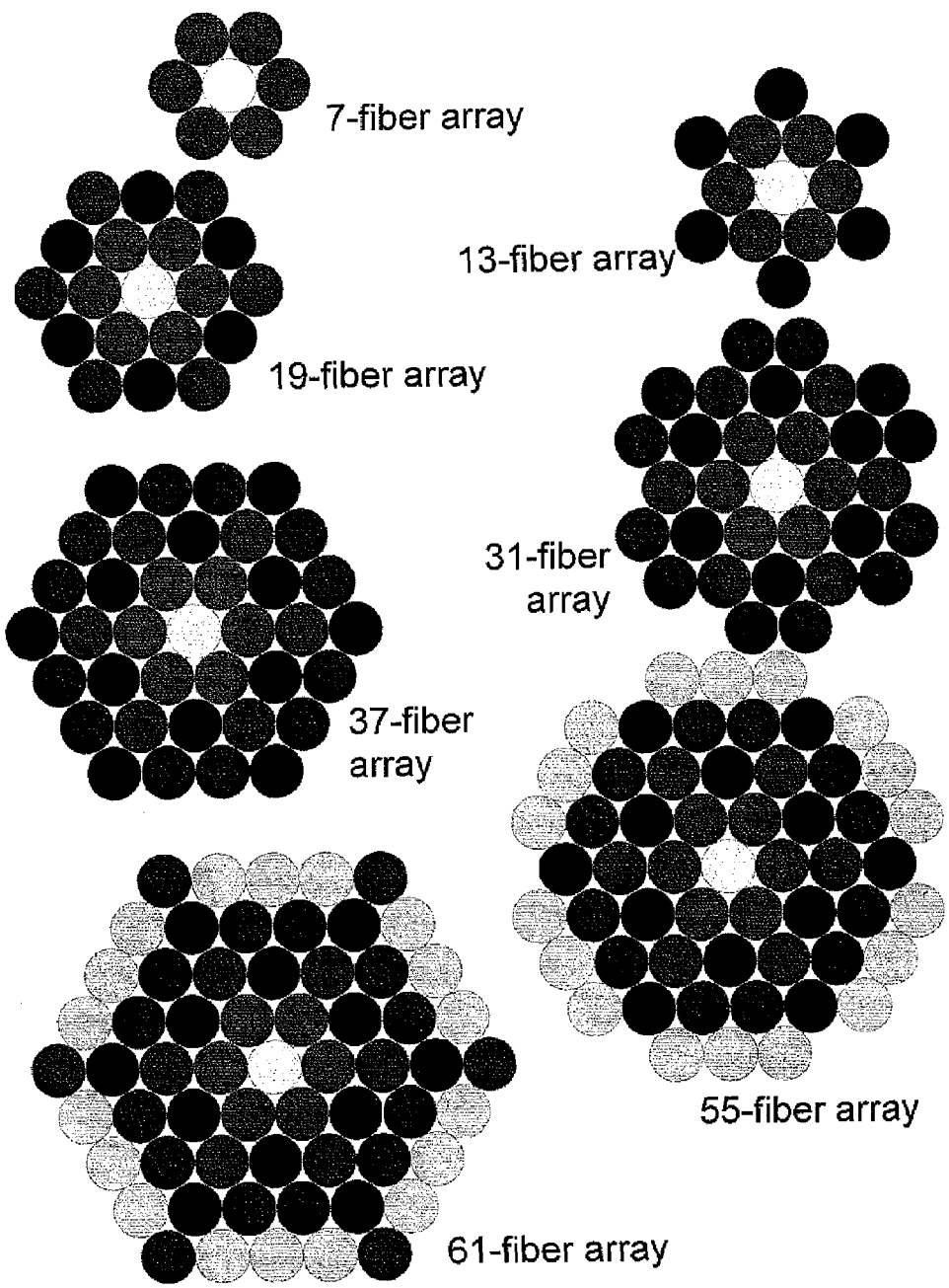
FIG. 9 is another graphical schematic representation of a component of yet another embodiment of the system of these teachings.

It is conventionally thought that cylinders naturally pack into dense, hexagonal arrays. In addition to the 96-fiber array shown in FIG. 3, a variety of simple hexagonal array geometries are shown in FIG. 9. Here conventional hexagonal arrays with six sides are formed with 7, 19, 37, and 61 fiber locations. In addition, by deleting the extreme vertex fiber positions, more circular forms containing 31 and 55 fibers are shown.

Figure 10:
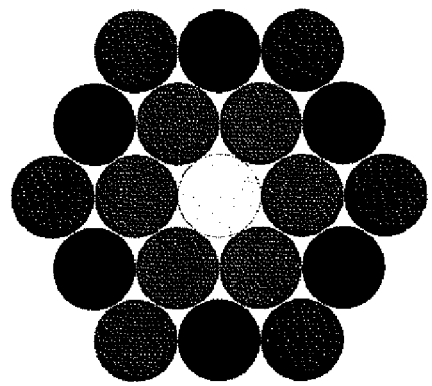
FIG. 10 is another graphical schematic representation of a component of a further embodiment of the system of these teachings.
Figure 10:
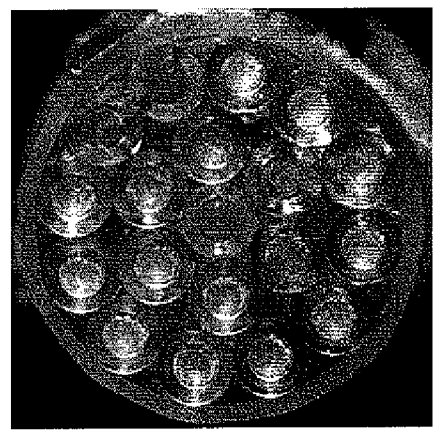
Figure 10:
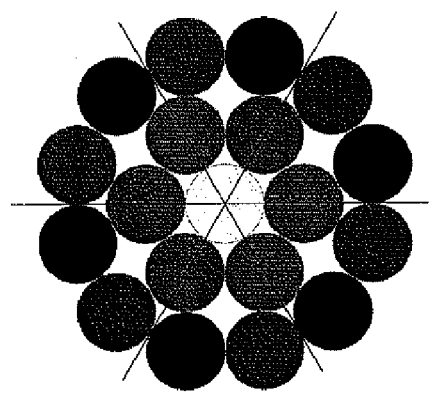

In embodiments of this system of these teachings, when using heat-shrink tubing, uniform pressure is exerted from the shrinking tube and the smaller the diameter of the packing geometry, the lower energy state it will represent. As a result, in some embodiments of systems of these teachings a circular hexagonal packing configuration, such as shown in FIG. 4, is obtained. The difference between the resultant circular hexagonal packing and the conventional hexagonal arrays is shown in FIG. 10.

Figure 11:
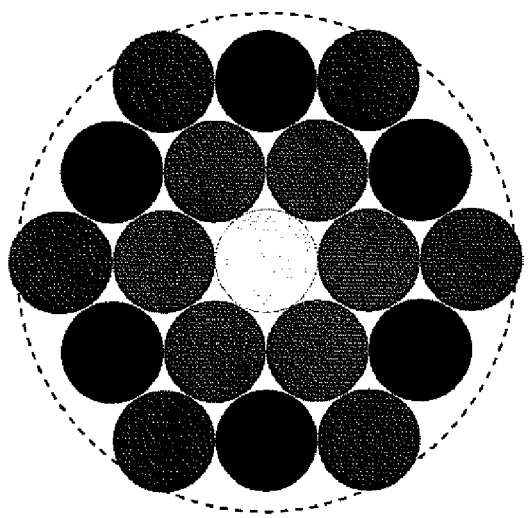
FIG. 11 is another graphical schematic representation of a component of yet a further embodiment of the system of these teachings.
Figure 11:
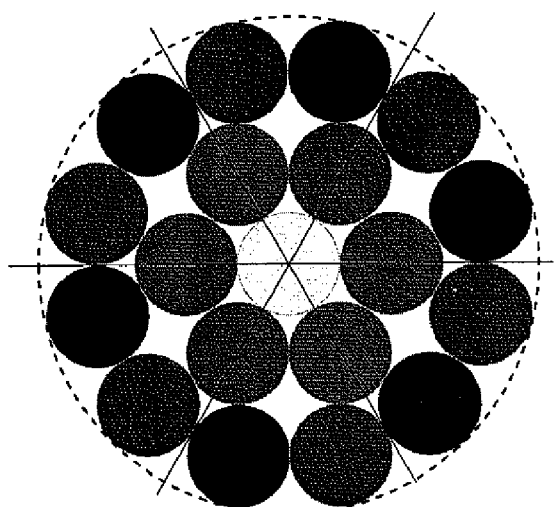

One explanation (not desiring to be bound by theory, these teachings are not limited only to any one explanation) for the preference of the hybrid circular-hexagonal packed geometry is illustrated in FIG. 11.

FIG. 11 shows a density comparison of regular-hexagonal and circular-hexagonal packing geometries. The dashed line circumscribes the circular-hexagonal packing geometry (bottom) and is overlaid on the regular hexagonal packing geometry (top). The circular-hexagonal packing geometry is slightly denser and minimized the overall array diameter—and is therefore a lower energy state for the uniformly compressive heat-shrink polymer wrap.

FIG. 11 shows a scale diagram for both the simple and hybrid circular-hexagonal arrays. The dashed circle was drawn to circumscribe the observed hybrid circular-hexagonal geometry. The same circle is shown over the expected hexagonal form, and it is seen that the simple hexagonal packing, while densest when allowing for an irregular boundary, is not as dense when constrained by a circular boundary as imposed by the recovering polymer jacket (which exerts a restoring force proportional to the stretched displacement).

Figure 12:
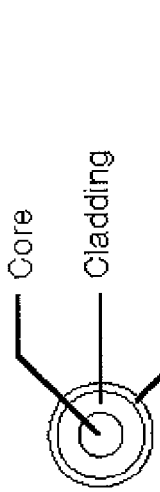
FIG. 12 is a tabular representation of conventional optical fibers used in embodiments of the system of these teachings.
Figure 13:
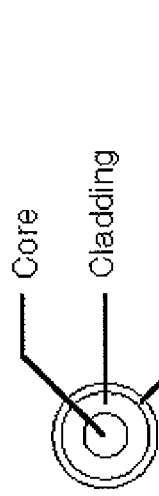
FIG. 13 is another tabular representation of conventional optical fibers used in embodiments of the system of these teachings.

Embodiments of this system of these teachings can be used with a broad range of fiber sizes and types. Some illustrative options are shown in FIG. 12 and FIG. 13. The tolerances in diameter for these off-the-shelf fibers allow for more accurate locations of the fibers in the arrays.

In one instance, the smaller fiber count UDAT connectors embodiments can be utilized for single mode fiber connectorization.

For example, but not limited to, a 7-fiber UDAT connector can be utilized with single mode fiber. The primary misalignment will likely be due to the variation in fiber core/cladding diameters. However, for the 7-fiber UDAT connector, the edge fiber positions will only be subject to a single fiber-pair cascade in diameter variations. Consider typical single mode fiber cases such as the conventional F-SMF-28 optical fiber. The conventional F-SMF-28 optical fiber has a mode field of 9.3+/−0.5 microns, with a cladding diameter of 125+/−1.0 microns. A simple pre-selection process may refuse this variation by half or more. Acceptable coupling efficiencies may be obtained with UDAT connector embodiments coupling single mode fibers in embodiments of UDAT fiber arrays.

One embodiment of the method of these teachings for high-fiber-number UDAT connector fabrication is to first manufacture ultra-stable and repeatable subarrays of fibers, such as with the 7 and 19 fiber UDAT arrays, and then to arrange these subarrays themselves in stable "superarray" formations. This embodiment is illustrated in FIG. 6. For example, these teachings not be limited to only this example, 7-fiber arrays are extremely stable and repeatable. Seven subarrays, each containing 7 fibers, can be arraigned in such a hexagonal array, resulting in a repeatable 49-fiber UDAT Superarray of these teachings. With a predetermined choice of material for sub-assembly, the hexagonal shape of each of the subarrays 60 automatically orients each of the subarrays rotationally as well as spatially in the superarray.

Similarly, in another embodiment, 19 of these 7-fiber subarrays can form a stable, oriented 133-fiber UDAT array. The same overall fiber number can be obtained by 7 subarrays, each containing 19 fibers (See FIG. 6). There are some tradeoffs between these dual 133-fiber Superarrays. For example, one case has slightly less density while the other case may be easier to rotationally align. Finally, since it was shown that the 19-fiber array is highly stable, there is the possibility that a superarray of 19 subarrays, each containing 19 fibers, would be stable and alignable. Such a construction would potentially enable an ultra-dense 361-fiber UDAT array that is inexpensive to manufacture and highly repeatable.

Another method of these teachings for improving the performance of the UDAT connectors of these teachings includes the formation of UDAT fiber arrays with stripped coatings. This technique produces arrays of fibers pressed cladding-to-cladding (with no coatings), and several distinct benefits are obtained. First, still higher densities can be obtained since wasted coating space is eliminated. Further, higher coupling efficiencies are expected since positional errors should decrease—this is due to the fact that the variations in coating thickness will no longer add to the positional errors of each fiber center from its ideal lattice point.

Figure 14:
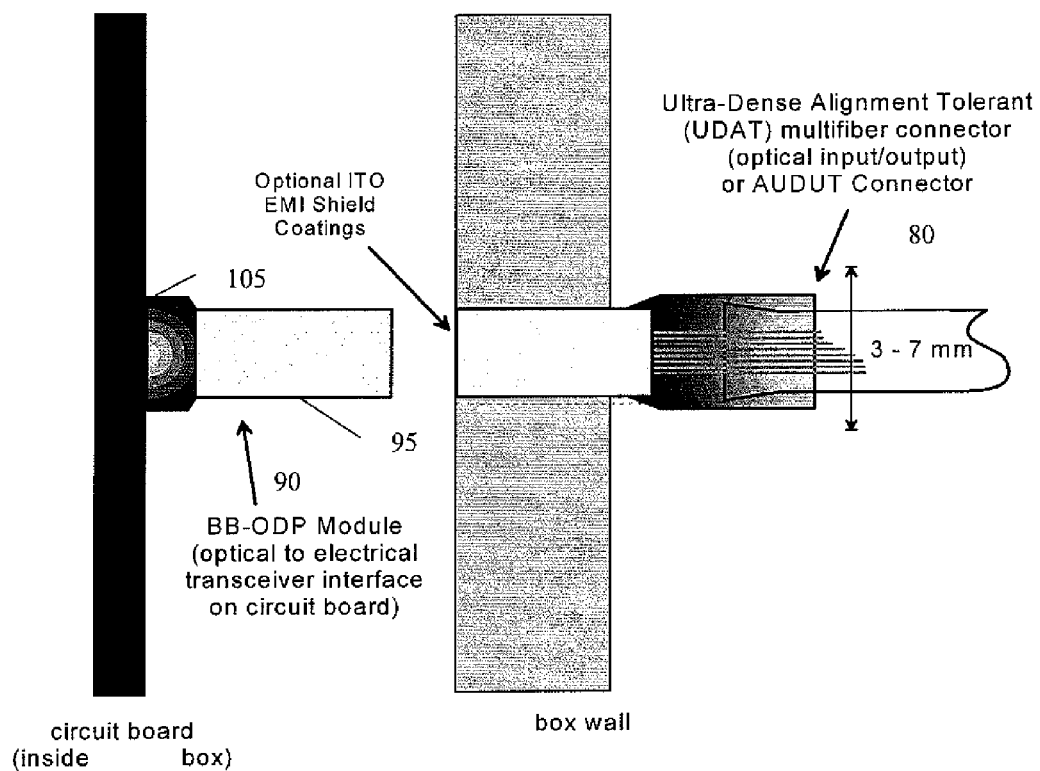
FIG. 14 is a schematic representation of yet another embodiment of the system of these teachings.

Another embodiment of the system of these teachings includes UDAT fiber connector, as shown in FIGS. 3 and 7, and the Optical Data Pipe technology disclosed in U.S. patent application Ser. Nos. 11/385,449, 10/675,873, and 09/425,551 (referred to as board to board-optical data pipe (.BB-ODP)). This embodiment is referred to as a Fiber Array Board Interface (FABI). The UDAT Fiber Array Board Interface embodiment is shown in FIG. 14. In this embodiment, the UDAT connector is inserted into an Enclosure through a port in the wall. Each of the fibers creates a plane wave at differing angles, and these are all imaged onto a dense hexagonally packed detector array in the SB-ODP module 90 (in one instance, signals from a hundred fibers are converted to electrical signals on the circuit board through solder bumps in a footprint of only a few millimeters square) such as the optical data pipe modules disclosed in U.S. patent application Ser. No. 11/385,449, which is incorporated by reference herein. (The BB-ODP module 90 shown there in includes another infinite conjugate imager 95 and means 105, such as an array of detectors where each detector has substantially a preselected size, fixedly secured to an end of the other infinite conjugate imager 95 for receiving electromagnetic radiation.) The standard off-the-shelf alignment tolerances for boards in a card cage are more than sufficient for the interconnection shown (displacements on the order of millimeters are readily tolerated).

A further use on the FABI embodiment is in direct fiber-to-circuit board connectors. The UDAT embodiment can be used to bring the optical signals directly from fiber cables to circuit board interfaces, or alternatively, from dense UDAT connectors in the chassis box to FABI connectors on the circuit boards. These embodiments of the FABI Connectors of these teachings contain an integrated high-density surface optoelectronic module that converts the 96 or more signals from a single UDAT connector to on-board signals, all with the tiny footprint of a few millimeters across.

In this embodiment, the UDAT connector (right) is inserted into the Enclosure through a port in the wall. Each of the fibers creates a plane wave at differing angles, and these are all imaged onto a dense hexagonally packed detector array in the BB-ODP module (left). Here signals from a hundred fibers are converted to electrical signals on the circuit board through solder bumps in a footprint of only a few millimeters square.

The standard off-the-shelf alignment tolerances for boards in a card cage are more than sufficient for the interconnection shown (displacements on the order of millimeters are readily tolerated).

Figure 15:
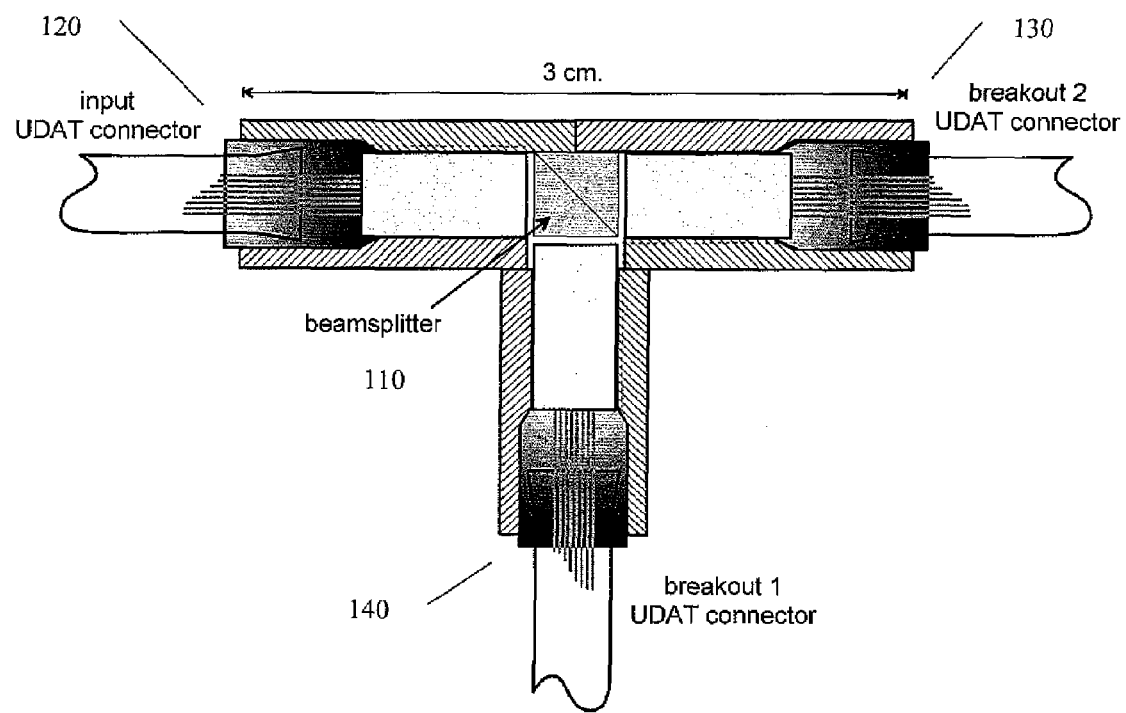
FIG. 15 is a schematic representation of a further embodiment of the system of these teachings.

By combining the UDAT connector technology for footprint reduction on the outside of an enclosure, coupled with the FABI technology linking the UDAT to the circuit board with another gain in footprint reduction is obtained In another embodiment, of the UDAT connector of these teachings is utilized in a variety of fanout and breakout configurations. For example, the UDAT embodiment can be utilized in signal breakout and fanout configurations as illustrated in FIG. 15 and FIG. 49, as well as low EMI chassis connectors and interconnects. In one instance, these teachings not be limited only to that instance, micro-optic beamsplitters 110 are used to couple the various UDAT connectors 120, 130, 140. In one embodiment, the beamsplitter 110 is placed in the collimated-wave region of the infinite conjugate interconnects.

Figure 16:
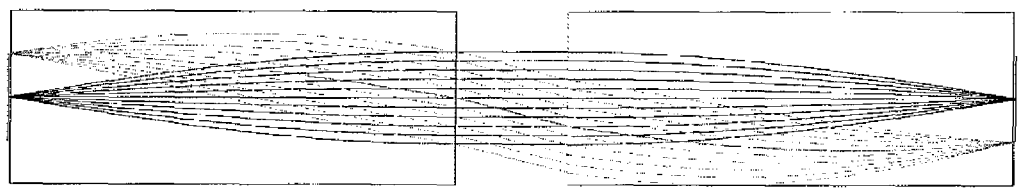
FIG. 16 is a graphical schematic representation of ray trace results for an embodiment of the system of these teachings.

A series of raytrace analyses of the UDAT connector concept was performed using the ZEMAX optical design software. One such real ray trace is shown in FIG. 16.

In the UDAT connector of these teachings the gap region between the two lenses will be small, providing an essentially telecentric imaging condition for the connector. This will minimize coupling efficiency degradation toward the edges of the optical fiber arrays.

If the fiber arrays are located on a surface of the infinite conjugate gradient index rod lens, the array will be telecentric for very small lens separations. Offsetting the fiber arrays from the end surface slightly can accommodate larger lens separations. The telecentric condition is useful for maintaining large coupling efficiency at the edges of the fiber array, since the bundle of rays will be centered on the acceptance angle of the fiber.

Figure 17:
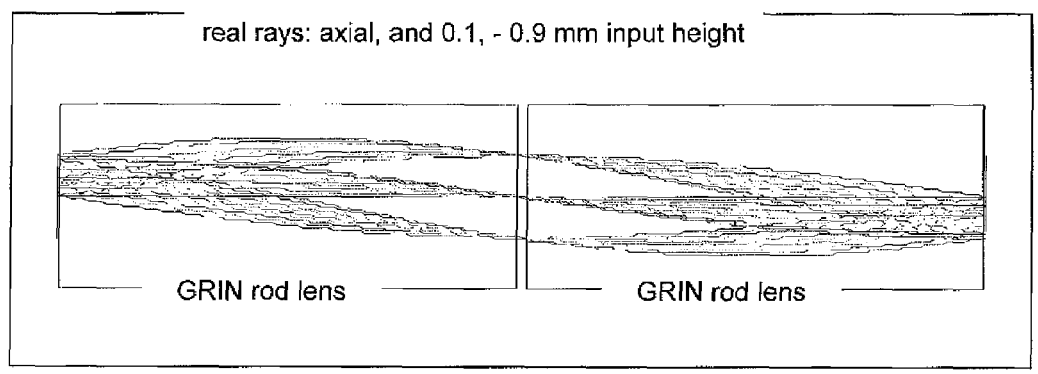

FIG. 17 shows Real Rays for 10 Fiber Locations in a Modeled UDAT Connector of these teachings.

Real rays are drawn for fiber locations on axis and at heights of 0.1, 0.2, 0.3, 0.4, 0.5, 0.6, 0.7, 0.8, and 0.9 mm. The telecentricity is important for maintaining a large coupling efficiency.

The spot sizes were optimized at a partial field height in order to increase the area over which the spot sizes remain small. The largest excursion radius of any ray in this set is 18.9 microns at an object height of 0.9 mm.

Heat shrink polymer tubes (it should be noted that other his shrinkable materials are within the scope of this teachings) used in embodiments of the system of these teachings are commercially available and described in available commercial literature. The term heat-shrinkable jacket or tubing is intended to include tubing, jackets, tapes, wraps or coatings comprising heat-shrinkable materials that may be wrapped around the desired portion of the optical fiber cable. The first step in making a heat shrink polymer tube is to start with a thermoplastic material that is extruded into tubes. Crystalline bonds that are readily broken down by heating hold the thermoplastic tubes together.

The second step is to add a cross-linked superstructure throughout the polymer tube material. This cross-linked superstructure transforms the tube into a thermoset material, and the tubes will no longer melt when heated.

The third step in making the heat-shrink polymer material is to heat and expand the tube. In this process the crystalline bonds are broken and the cross-linked superstructure is stretched, like a wire-mesh cage, to two or three times the former tube diameter.

The fourth step is to rapidly cool the stretched cross-linked tube. This allows the crystalline bonds to re-form, locking the stretched tube into its expanded form with the potential contractile energy stored in the "frozen" tube system.

Finally, to complete the heat-shrink polymer tube cycle, the polymer tube is placed over the items to enclose and it is heated again. This final heating melts the crystalline bonds that are temporarily holding the stretched tube in its expanded condition, and the tube now relaxes and tries to recover its original diameter. This compresses the encapsulated material, and relaxes stresses stored in the polymer. Upon cooling, the crosslinked structure is further strengthened by re-formed crystalline bonds.

This type of material process is utilized for the UDAT Connector dense fiber array assembly and manufacture.

The types of polymers readily used in this process include many materials such as polyolefin, neoprene, Teflon, and Kynar.

In order to further illustrate the system of these teachings, exemplary results from sample embodiments are shown herein below. The first set of results presented relate to fiber coupling efficiency relative to a standard FC-FC connector as a function of fiber position in a UDAT fiber array of these teachings. In this measurement, first the two FC fiber connectors were coupled with a standard FC-FC (butt-) coupler, and the power transmitted through both fibers and the standard coupler was referenced as the 0 dB level. Then the input fiber was aligned on the rear edge of the first (right) rod lens, and coupled via the infinite conjugate imaging system to the receive fiber located near the front edge of the second (left) rod lens. The power transmitted through the two fibers and UDAT connector feasibility prototype was then read relative to the reference (See FIG. 18). Next, the transmit fiber was translated across the rod lens by 10 micron steps (near the edge of the rod lens) or 20 micron steps (near the center of the rod lens). At each of these positions, the receive fiber was aligned for maximum coupling efficiency, and the coupling efficiency was read in dB relative to the reference. This coupling efficiency vs. displacement data is plotted in the curve given in FIG. 18.

Figure 18:
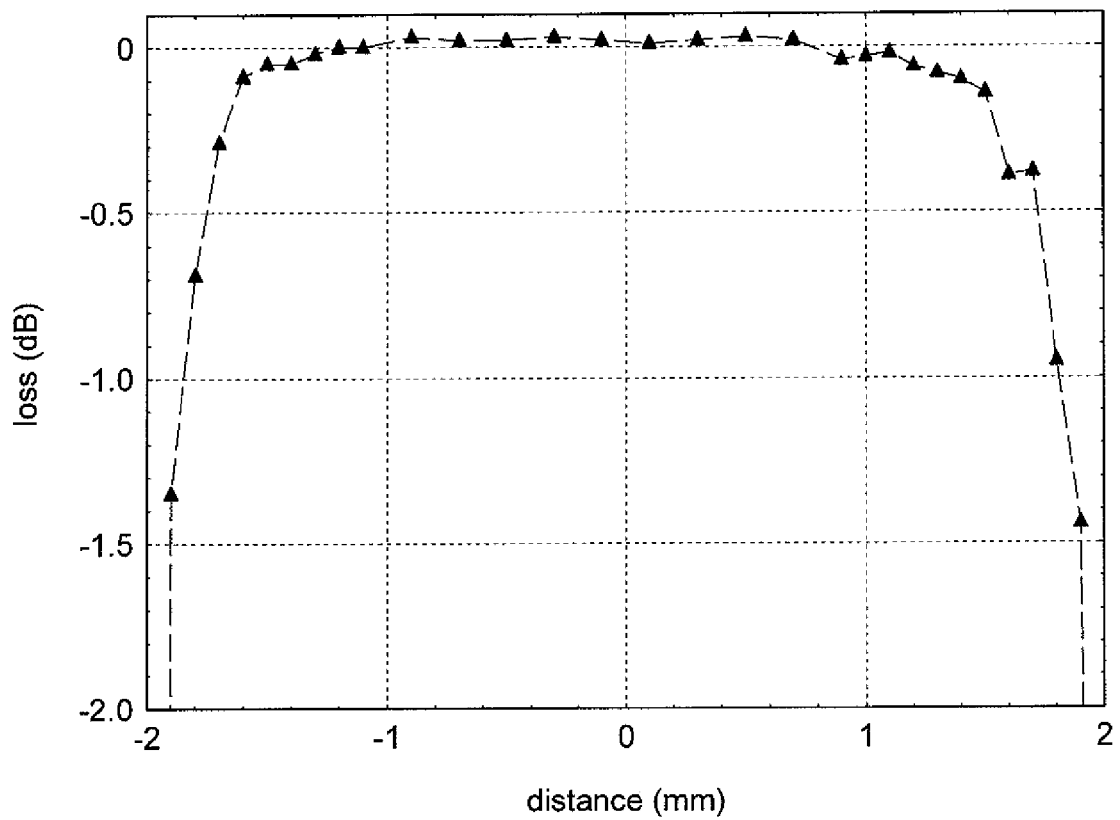
FIGS. 18-21 are graphical schematic representations of results from measurements utilizing an embodiment of the system of these teachings.

FIG. 18 depicts UDAT Coupling Loss (in dB) vs. Position of the Input Fiber on the Rod Lens Face, Relative to A Standard FC-FC Coupler. As can be seen from FIG. 18, the coupling efficiency is approximately as good or better than the reference connector, and that the coupling efficiency is very high over roughly half of the rod lens face aperture. This suggests that UDAT array fibers bundled over the center 2 mm diameter of the rod lens should exhibit high coupling efficiencies.

Figure 19:
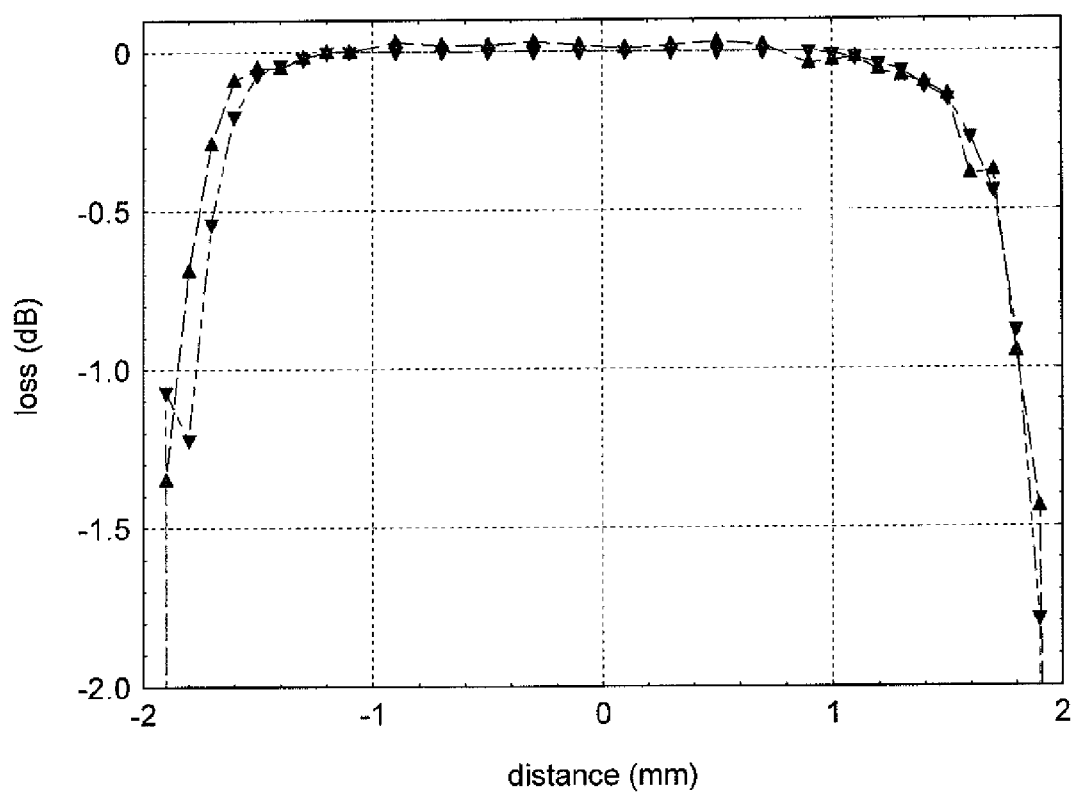

This procedure was repeated over a second scan across the face of the rod lens, with a slight displacement from the first scan. Both curves are shown together in FIG. 19. In the embodiment measure, There were slight imperfections (chips) on the edges of the rod lens, and it is believed that those gave rise to the jagged variations at the sides of the curves.

The above figures indicate that a large coupling efficiency is obtained with the fibers in the center of the rod lenses and that efficiency was maintained across nearly half of the width of the lens face. This implies that UDAT fiber arrays spanning half of the width of the rod lens face should all exhibit relatively high coupling efficiencies. As described earlier, this result corresponds to high overall UDAT fiber connector densities.

A second set of measurements using the UDAT prototype alignment testbed provides understanding of expected misalignment sensitivities in the UDAT connector. In this measurement, the receive fiber position was held fixed, and the position of the transmit fiber was swept while monitoring coupled power. The power coupled through the UDAT connector is graphed in FIG. 20 as a function of the transmit fiber displacement.

Figure 20:
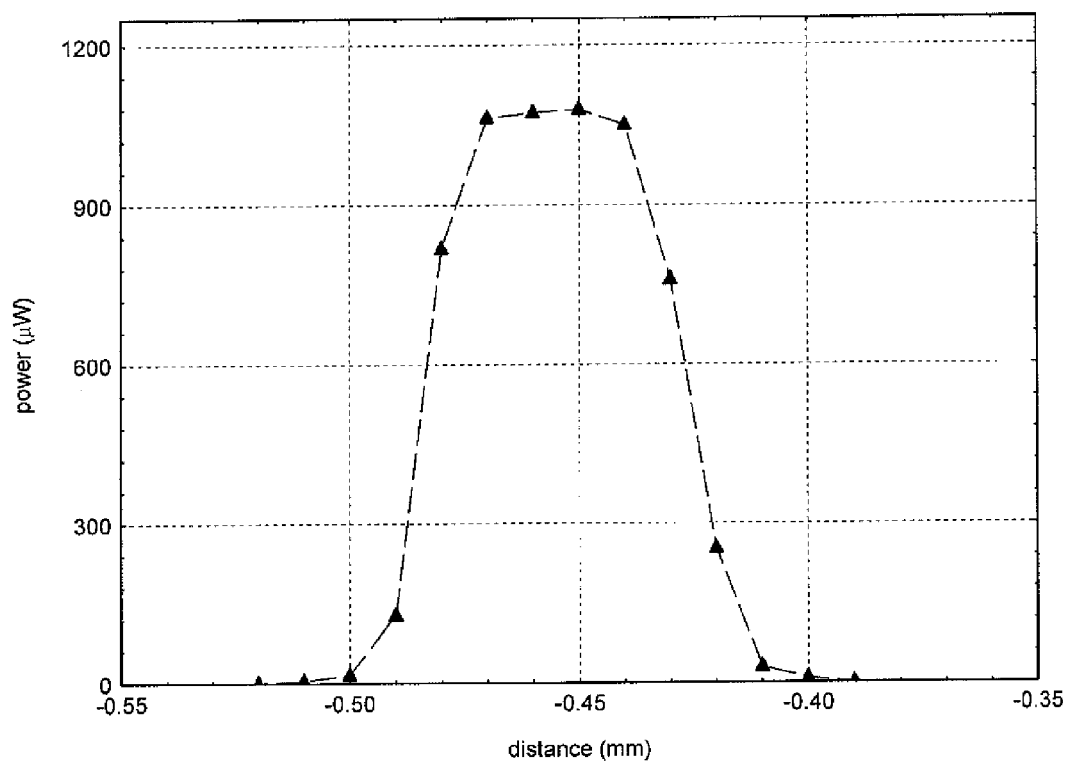

Referring to FIG. 20, the graph of coupled power vs. input fiber position shown therein (output fiber location fixed) reveals a wide positional misalignment tolerance of roughly 30 microns. Such a tolerance indicates tolerance to positional errors in large UDAT fiber arrays of these teachings.

The receive fiber displacements represent the tolerance for effects of varying fiber diameters in the UDAT fiber array. Since not all fibers have exactly identical diameters, the positions of the fibers in the UDAT fiber arrays vary slightly from the ideal.

This data of FIG. 20 shows a relatively wide positional alignment tolerance for a specific fiber placement in an embodiment of a UDAT array of roughly 30 microns (it should be noted that these measurements are not a limitation of these teachings).

A still further series of measurements, using a UDAT prototype alignment testbed, of expected crosstalk levels in the UDAT connector were performed. In the measurements shown in FIG. 21, the receive fiber position was held fixed, and the position of the transmit fiber was swept while monitoring coupled power—this time recorded in dB relative to the peak coupling efficiency. The measurement data is plotted as loss as a function of displacement in FIG. 21. As the transmit fiber is walked off the receive fiber, the coupled power drops rapidly to the −50 dB level, which is roughly the level of accuracy of the power meter used in this measurement. This data suggests that the level of crosstalk from one fiber to a near neighbor will be less than −50 dB (it should be noted that these measurements are not a limitation of these teachings).

Figure 21:
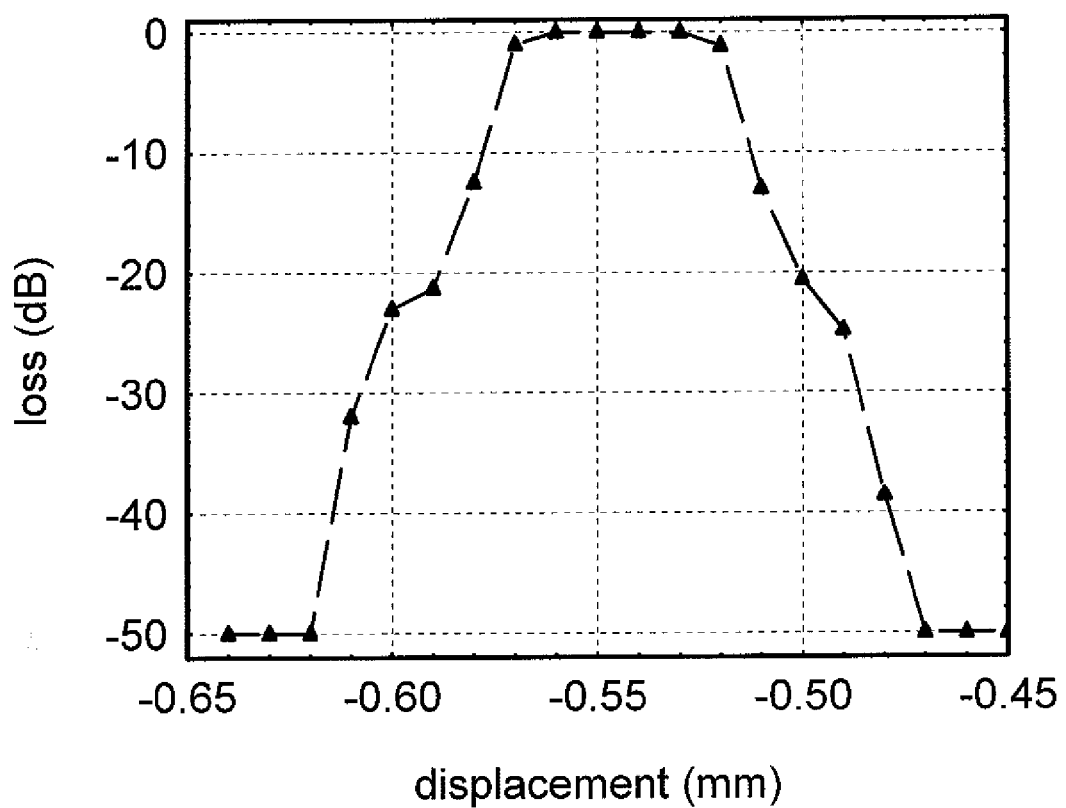

Referring to FIG. 21, as one fiber is displaced from the other, the coupled power drops to below −50 dB crosstalk levels very rapidly. The −50 dB level corresponds approximately to the limit of the power meter used in the measurement and actual crosstalk levels may be substantially lower.

Figure 22:
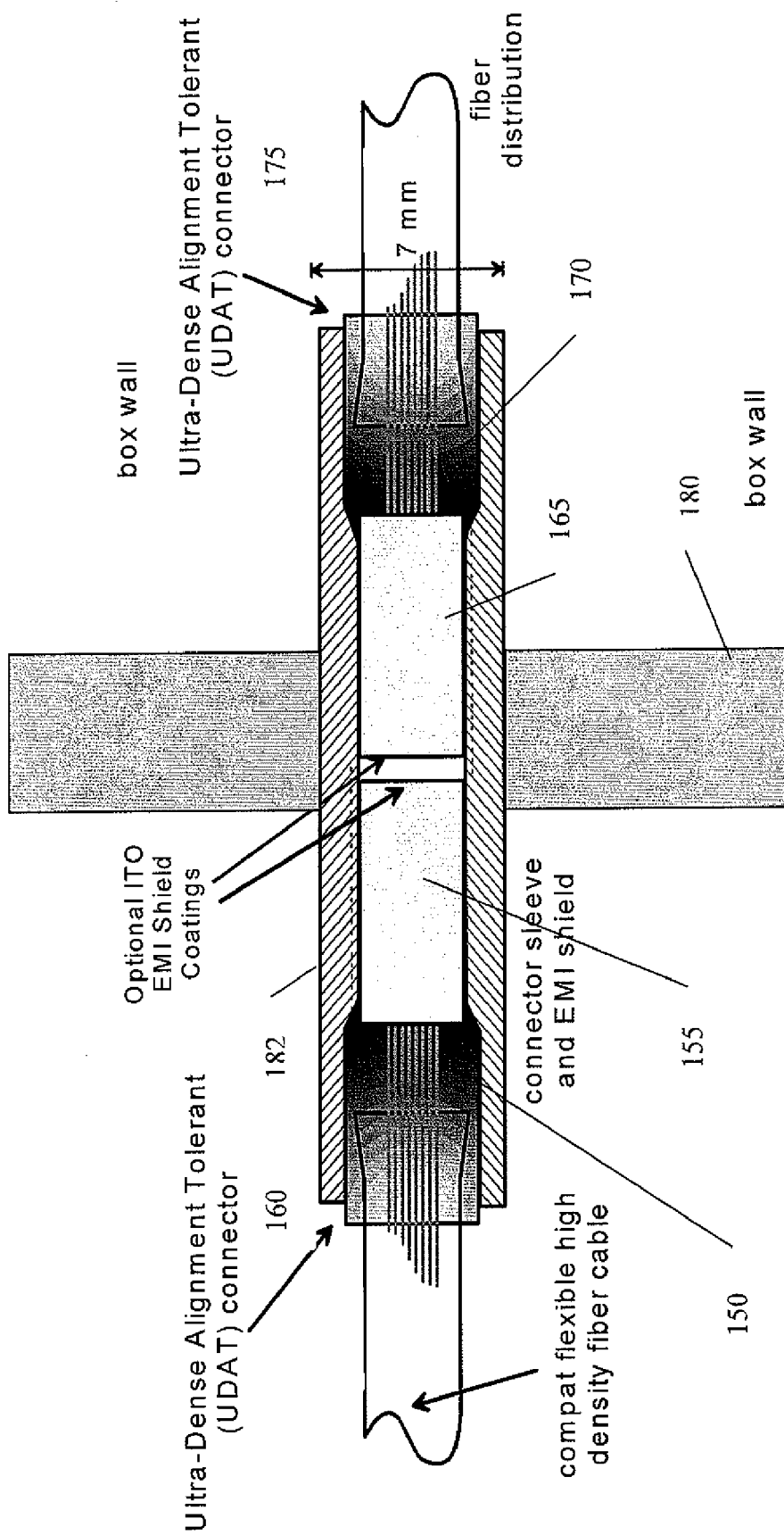
FIGS. 22-24 are schematic representations of yet further embodiments of the system of these teachings.

An embodiment UDAT Connector of these teachings applied to the enclosure applications as illustrated in FIG. 22.

Referring to FIG. 22, embodiments of a connector system of these teachings and 160, 175 are shown coupling 96 fibers 150, 170 (other number of fibers including a higher number of fibers are also within the scope of this teachings, and as discussed hereinabove) to an enclosure 180 with a footprint of only several millimeters. The Enclosure size and weight and EMI cross-section are greatly reduced due the high density. In some instances, low-loss ITO coatings on one or both of the lenses 155, 165 increases the EMI isolation through the glass. In another instance, the connector sleeve is easily shielded or made from a metal.

Figure 23:
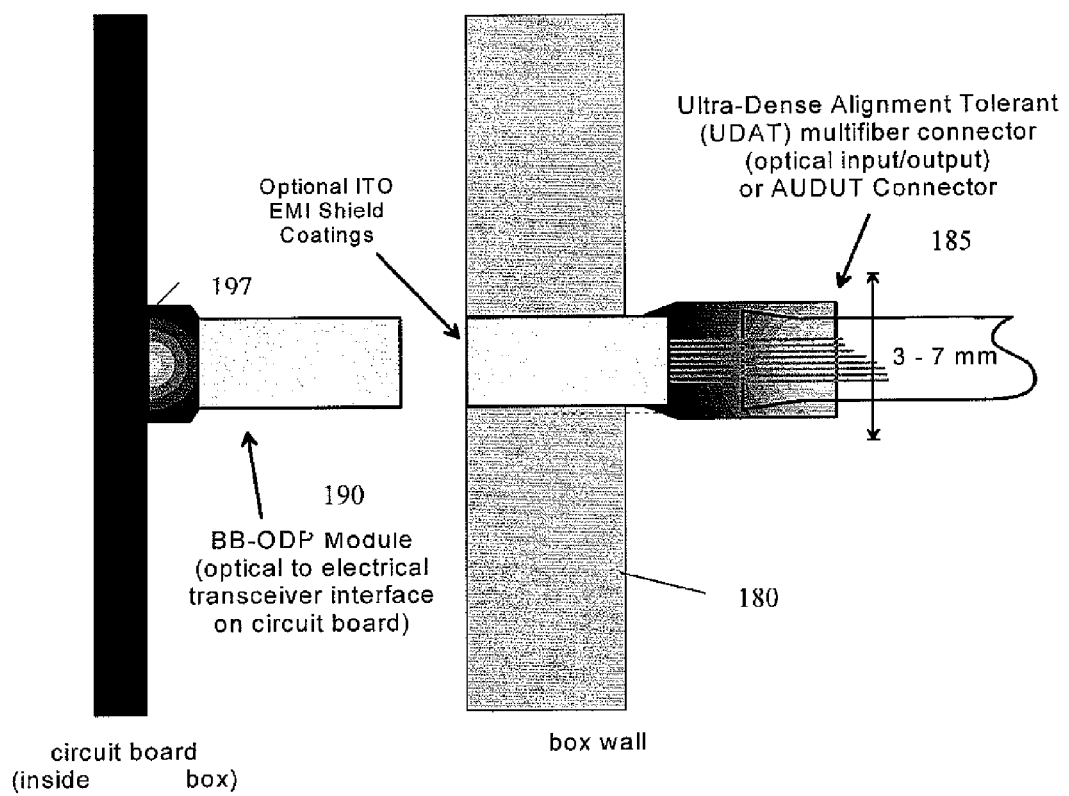

Referring to FIG. 23, an embodiment of the UDAT Connector of these teachings 185 (right) is inserted into the through a port or connector in the wall 180. Each of the fibers creates a plane wave at differing angles, and these are all imaged onto a dense hexagonally packed detector array in the matching BB-ODP module 190 (left). Signals from a hundred fibers are converted to electrical signals on the circuit board through solder bumps in a footprint of only a few millimeters square. The standard off-the-shelf alignment tolerances for boards in a card cage are more than sufficient for the interconnection shown (displacements on the order of millimeters are readily tolerated). The detector array 197 may be replaced with a source array, such as a VCSEL array, where electrical signals on the board are converted to optical signals that are coupled to the fibers using the FABI. Similarly, combinations of light emitting and detecting elements may be tiled on the board so that signals are received from some fibers and transmitted out on other fibers. These embodiments are described in U.S. patent application Ser. Nos. 11/385,449, 10/675,873, and 09/425,551.

This fanout capability was discussed in hereinabove, and is illustrated in FIG. 15. In addition to the fanout geometry of FIG. 15, the embodiment shown in FIG. 15 is readily expandable to more complicated breakout and fanout geometries. For example, another fanout/breakout geometry is shown in FIG. 24 (these teachings not being limited only to the embodiment shown in FIG. 24).

Figure 24:
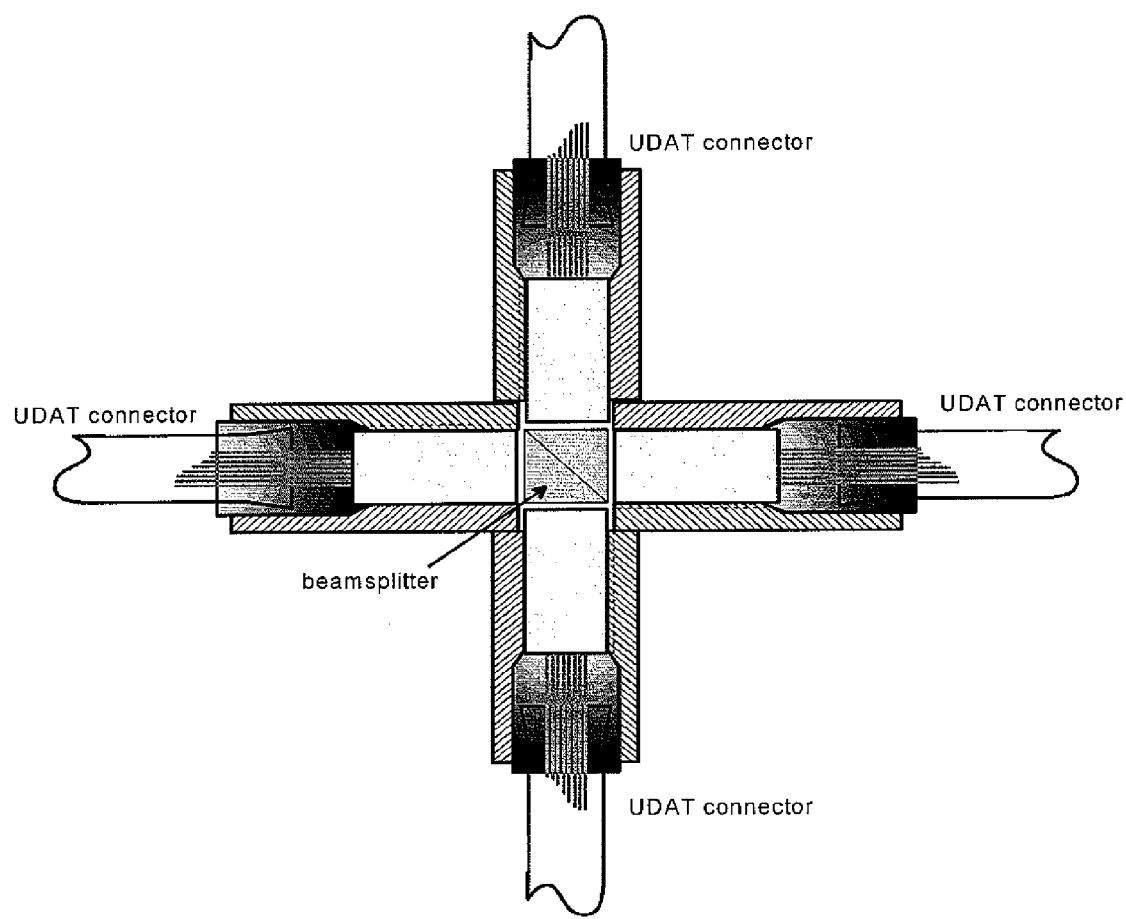

The UDAT connector technology is readily expandable to more complicated breakout and fanout geometries as shown in FIG. 24, and further is extendable to direct connection to circuit boards. This flexibility is a further difference between embodiments of the optical connector of these teachings and conventional high-density connectors.

Although the invention has been described with respect to various embodiments, it should be realized this invention is also capable of a wide variety of further and other embodiments within the within the spirit and scope of the appended claims.

What is claimed is:

1. A method for arranging optical fibers in an end portion of an array of optical fibers such that each optical fiber from the array is in substantially close proximity to at least two other optical fibers from the array, the method comprising the steps of:
    inserting at least the end portion of the array of optical fibers into heat shrinkable tubing; heating the heat shrinkable tubing to a temperature sufficient to cause the heat shrinkable tubing to melt, said temperature not causing detrimental effects to optical fibers from the array; and
    allowing the heat shrinkable tubing to cool in order to obtain a substantially optimal close proximity configuration of the array of optical fibers; said substantially optimal close proximity configuration being obtained by a substantially minimizing a predetermined quantity.

2. An array of optical fibers arranged by the method of claim 1.

3. A method for arranging optical fibers in an array of optical fibers such that each optical fiber from at least a group of fibers from said array is in substantially close proximity to at least two other optical fibers from said at least a group of fibers from said array, the method comprising the steps of:
    a) selecting one group of optical fibers from the array of optical fibers;
    b) inserting at least the end portion of the selected group of optical fibers from the array of optical fibers into heat shrinkable tubing;
    c) heating the heat shrinkable tubing to a temperature sufficient to cause the heat shrinkable tubing to melt, said temperature not causing detrimental effects to optical fibers from the array;
    d) allowing the heat shrinkable tubing to cool in order to form an arranged selected group of optical fibers; said arranged selected group of optical fibers having a substantially optimal close proximity configuration; said substantially optimal close proximity configuration being obtained by a substantially minimizing a predetermined quantity
    e) selecting at least another group of optical fibers from the array;
    f) repeating steps b) through d) for said at least another group of optical fibers;

g) inserting at least an end portion of said arranged selected groups of optical fibers and said at least another arranged selected group of optical fibers obtained in steps in d) and f) into another heat shrinkable tubing;

h) heating said another heat shrinkable tubing to a temperature sufficient to cause the other heat shrinkable tubing to melt, said temperature not causing detrimental effects to optical fibers from the array; and i) allowing said another heat shrinkable tubing to cool.

4. An array of optical fibers arranged by the method of claim 3.

5. A method for fabricating an optical connector, the method comprising the steps of:

inserting at least an end portion of an array of optical fibers into heat shrinkable tubing; heating the heat shrinkable tubing to a temperature sufficient to cause the heat shrinkable tubing to melt, said temperature not causing detrimental effects to optical fibers from the array; and allowing the heat shrinkable tubing to cool in order to obtain a substantially optimal close proximity configuration of the array of optical fibers; said substantially optimal close proximity configuration being obtained by a substantially minimizing a predetermined quantity;

polishing an end of the end portion of the array;

aligning the polished end with respect to a first end of an optical subsystem, the optical subsystem having the first end and a second end, each optical fiber in the end portion of emitting electromagnetic radiation, the optical subsystem receiving the electromagnetic radiation emitted by said each optical fiber and forming, from the received electromagnetic radiation, an image substantially at infinity; and securing the polished end and the end portion of the array to the first end of the optical subsystem.

6. An optical connector fabricated by the method of claim 5.

7. A method for fabricating an optical connector, the method comprising the steps of:

a) selecting one group of optical fibers from the array of optical fibers;

b) inserting at least the end portion of the selected group of optical fibers from the array of optical fibers into heat shrinkable tubing;

c) heating the heat shrinkable tubing to a temperature sufficient to cause the heat shrinkable tubing to melt, said temperature not causing detrimental effects to optical fibers from the array;

d) allowing the heat shrinkable tubing to cool in order to form an arranged selected group of optical fibers; said arranged selected group of optical fibers having a substantially optimal close proximity configuration: said substantially optimal close proximity configuration being obtained by a substantially minimizing a predetermined quantity;

e) selecting at least another group of optical fibers from the array;

f) repeating steps b) through d) for said at least another group of optical fibers;

g) inserting at least an end portion of said arranged selected groups of optical fibers and said at least another arranged selected group of optical fibers obtained in steps in d) and f) into another heat shrinkable tubing;

h) heating said another heat shrinkable tubing to a temperature sufficient to cause the other heat shrinkable tubing to melt, said temperature not causing detrimental effects to optical fibers from the array; and i) allowing said another heat shrinkable tubing to cool;

j) polishing an end of the end portion of the arranged selected groups of optical fibers;

k) aligning the polished end with respect to a first end of an optical subsystem, the optical subsystem having the first end and a second end, each optical fiber in the end portion electromagnetic radiation, the optical subsystem receiving the electromagnetic radiation emitted by said each optical fiber and forming, from the received electromagnetic radiation, an image substantially at infinity; and l) securing the polished end and the end portion of the array to the first end of the optical subsystem.

8. An optical connector fabricated by the method of claim 7.

* * * * *

UNITED STATES PATENT AND TRADEMARK OFFICE
CERTIFICATE OF CORRECTION

PATENT NO. : 7,660,502 B1  Page 1 of 1
APPLICATION NO. : 11/777170
DATED : February 9, 2010
INVENTOR(S) : Thomas W. Stone It is certified that error appears in the above-identified patent and that said Letters Patent is hereby corrected as shown below:

In column 10, line 63 (claim 3) "quantity" should read -- quantity; --

In column 11, line 29 (claim 5) "portion of emitting" should read -- portion emitting --

In column 12, line 11 (claim 7) "configuration:" should read -- configuration; --

In column 12, line 20 (claim 7) "groups of optical fibers" should read -- group of optical fibers --

In column 12, line 33 (claim 7) "portion electromagnetic radiation" should read -- portion emitting electromagnetic radiation --

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,660,502 B1  Page 1 of 1
APPLICATION NO. : 11/777170
DATED : February 9, 2010
INVENTOR(S) : Thomas W. Stone It is certified that error appears in the above-identified patent and that said Letters Patent is hereby corrected as shown below:

In the Specification

In column 1, lines 16-17, "Contract FA8650-04-C-3414" should read -- Contract F33615-03-M-3337 --

Signed and Sealed this
Twenty-first Day of October, 2014

Michelle K. Lee
*Deputy Director of the United States Patent and Trademark Office*